United States Patent [19]

Okamura

[11] Patent Number: 5,307,330
[45] Date of Patent: Apr. 26, 1994

[54] SETTLING MONITOR SYSTEM FOR A FOLLOWING SERVO

[75] Inventor: Eiji Okamura, Kawasaki, Japan

[73] Assignee: Fujitsu Limited, Japan

[21] Appl. No.: 831,530

[22] Filed: Feb. 5, 1992

[30] Foreign Application Priority Data

Feb. 6, 1991 [JP] Japan .................................. 3-14624

[51] Int. Cl.$^5$ .............................................. G11B 7/00
[52] U.S. Cl. .................................. 369/32; 369/44.32;
369/44.27; 360/78.06; 360/78.14
[58] Field of Search ..................... 369/32, 44.27, 44.28,
369/44.32, 44.33; 360/78.04, 78.09, 77.02,
78.06, 78.11, 78.14

[56] References Cited

U.S. PATENT DOCUMENTS

| | | | |
|---|---|---|---|
| 3,881,184 | 4/1975 | Koepeke et al. | 369/32 |
| 4,381,526 | 4/1983 | McLaughlin et al. | 360/78.07 |
| 4,679,103 | 7/1987 | Workman | 360/78.14 |
| 5,095,471 | 3/1992 | Sidman | 369/32 |
| 5,126,897 | 6/1992 | Ogawa et al. | 360/78.09 |

FOREIGN PATENT DOCUMENTS

| | | |
|---|---|---|
| 0381519 | 8/1990 | European Pat. Off. . |
| 54007 | 5/1978 | Japan . |
| 257682 | 11/1987 | Japan . |
| 23280 | 1/1988 | Japan . |
| 63-275082 | 11/1988 | Japan . |
| 63-298861 | 12/1988 | Japan . |
| 286192 | 11/1989 | Japan . |
| 2-35269 | 9/1990 | Japan . |
| 2-35271 | 9/1990 | Japan . |

OTHER PUBLICATIONS

Gene F. Franklin et al., "Digital Control of Dynamic Systems" (Second Edition), 1990, pp. 238-273 and pp. 417-431, 1990.

Primary Examiner—Robert J. Pascal
Assistant Examiner—Tan Dinh
Attorney, Agent, or Firm—Welsh & Katz, Ltd.

[57] ABSTRACT

In a system for monitoring settling of a transient response of a load controlled by a following controller, a state estimation unit generates a state estimation quantity which shows an estimated state of the load. A settling evaluation function operation unit generates an evaluated output by inputting, to a predetermined settling evaluation function, the state estimation quantity and a control quantity output to the load by the following controller. A count unit generates time data showing a time elapsed since commencement of supervision of settling. A comparator unit compares the evaluated output and the time data with each other, and replaces the time data of the counter unit with the evaluated output on the basis of a comparison result. A decision making unit generates a settling completion signal when the time data shows a predetermined time.

20 Claims, 12 Drawing Sheets (a) POSITION ERROR SIGNAL (b) POSITION MONITOR SIGNAL (c) SETTLING COUNTER (d) SEEK COMPLETION SIGNAL

SETTLING MONITOR SYSTEM FOR A FOLLOWING SERVO

BACKGROUND OF THE INVENTION

(1) Field of the Invention

The present invention generally relates to a following servo control apparatus, such as a servo mechanism for positioning heads of a magnetic disk apparatus. More particularly, the present invention is concerned with a settling monitor system which detects an event that a predetermined settling condition has been satisfied after a transient state.

(2) Description of the Related Art

Recently, an effort has been made to reduce the space between concentric recording tracks in order to increase the recording density, and it has been required that heads be positioned more precisely.

Generally, a disk storage apparatus is used as a data storage device. Thus, it is necessary to prevent data recorded on a track from being erased due to erroneous head positioning, and from being magnetically weakened. For these requirements, in a normal write mode, a head position signal showing a quantity to be controlled is monitored, and an upper device, such as a computer, is notified of a following control error if the level of the head position signal exceeds a predetermined threshold value.

Meanwhile, the head is moved in a seek operation in order to access requested data. The seek operation ends when the head movement has been completed so as to position the head on a desired track position, and a transient response has been settled in the positioned state. After the completion of the seek operation, the occurrence of a following control error is not permitted because data writing starts from this time.

As described above, the magnetic disk apparatus needs the settling monitor procedure for the following control after the completion of the seek operation. A settling decision reference signal is set to a value smaller than an off-track value which does not reduce a reproduction signal level of data recorded on an adjacent track. That is, the settling decision reference signal is selected so that it has a margin. When the transient response is continuously within a range defined by the settling decision reference signal for a predetermined settling monitor time, it is determined that the settling has been completed. In order to decrease the error rate, a long settling monitor time is needed, and hence the access time is lengthened. Hence, it is desired that a desired or target error rate can be obtained by a settling monitor time as short as possible.

FIG. 1 is a block diagram of a magnetic disk apparatus equipped with a conventional settling monitor system. A magnetic head 102 of a magnetic disk apparatus 100 reads a position information signal from a magnetic disk. A position detector 104 amplifies and demodulates the position information signal from the magnetic head 102, and generates a position error signal PE indicating a deviation from a target track. A servo MPU (Micro-Processor Unit) 108 executes a digital servo process, and reads a digital signal obtained by converting the position error signal PE from the position detector 104 by means of an AD (Analog to Digital) converter 106. The servo MPU 108 executes an operation necessary for the following control process by means of, for example, a digital filter. The digital signal output by the servo MPU 108 is converted into an analog signal by a DA (Digital to Analog) converter 110. The analog signal from the DA converter 110 is amplified by a power amplifier 112, and moves an actuator (VCM: Voice Coil Motor) 114.

The position error signal PE from the position detector 104 is also output to a window comparator 116, which compares it with a threshold value indicating an allowable following error limit. When the level of the position error signal PE exceeds the threshold value in the write operation, a servo error signal is generated, and output to an interface MPU 120 via an AND circuit 118. The servo error signal is then transferred to an upper device 200 by the interface MPU 120. The servo MPU 108 always supervises settling of the head 102 on the basis of the digitized position error signal PE. When the servo MPU 108 determines that the settling has been completed, it outputs a seek completion signal to the interface MPU 120.

FIG. 2 is a waveform diagram showing the conventional settling monitor process. At time t=0, the seek operation has just been completed and the following control process starts. As shown in FIG. 2(a), at t=0, the position error signal PE shows a large position error and is outside of a settling range indicated by hatching. The settling range is selected so that it is narrower than the detection range of the window comparator 116.

FIG. 2(b) shows a position monitor signal OP generated when the level of the position error signal PE is outside of the settling range. The servo MPU 108 has a built-in timer counter formed with hardware or firmware for use in supervision of settling (hereinafter this timer counter is referred to as a settling counter). When the position monitor signal OP is at a high level, the settling counter is continuously preset to a predetermined value which defines a predetermined settling monitor time Tst1. When the level of the position error signal PE enters the settling range, and hence the position monitor signal OP switches to the low level, the settling counter is decremented. When the settling counter value becomes equal to zero, the seek completion signal is generated, as shown in FIG. 2(d). In this manner, it is determined that the settling (seek) operation has been completed when it is detected that the position error signal PE is continuously within the settling range during the predetermined settling monitor time Tst1.

However, in conventional settling monitor systems as described above, there is a possibility that a following control error may occur after it is determined that the settling has been completed. Such a following control error is caused in a process as shown in FIG. 3. The position error signal PE is continuously within the settling range during the settling monitor time Tst1, and hence the condition for generating the seek completion signal is satisfied. However, immediately after this condition is satisfied, the position error signal PE goes out of the settling range.

In order to eliminate this problem, the settling monitor time Tst1 can be lengthened. However, this means increases in the access time, because the seek completion signal is generated at a delayed time.

FIG. 4 is a graph having a horizontal axis showing the settling monitor time Tst1, and a vertical axis showing the error rate (log scale) indicating how frequently following control errors occur. The settling monitor time Tst1 is determined based on an error rate of, for example $10^{-12}$.

It is desired that the settling monitor time Tst1 be short in order to shorten the access time. However, an allowable error rate must be satisfied. Generally, in cases as shown in FIG. 4, a mechanical part which is an object to be controlled has a plurality of resonant structures, which are excited due to a large acceleration during the seek operation. Hence, the cases as shown in FIG. 4 frequently take place under a condition where attenuating vibrations having different frequencies remain and are superimposed.

SUMMARY OF THE INVENTION

An object of the present invention is to provide a settling monitor system of a following control apparatus capable of reducing the error rate without increasing the settling monitor time.

This object of the present invention is achieved by a system for monitoring settling of a transient response of a load controlled by a following controller, the system comprising:

state estimation means for generating a state estimation quantity which shows an estimated state of the load;

settling evaluation function operation means, coupled to the load and the state estimation means, for generating an evaluated output by inputting, to a predetermined settling evaluation function, the state estimation quantity and a control quantity output to the load by the following controller;

timer means for generating time data showing a time passage of supervision of settling;

comparator means, coupled to the settling evaluation function operation means and the timer means, for comparing the evaluated output and the time data with each other and for replacing the time data of the timer means with the evaluated output on the basis of a comparison result; and decision making means, coupled to the timer means, for generating a settling completion signal when the time data shows a predetermined time.

BRIEF DESCRIPTION OF THE DRAWINGS

Other objects, features, and advantages of the present invention will become more apparent from the following detailed description when read in conjunction with the accompanying drawings, in which.

DESCRIPTION OF THE PREFERRED EMBODIMENTS

Figure 5:
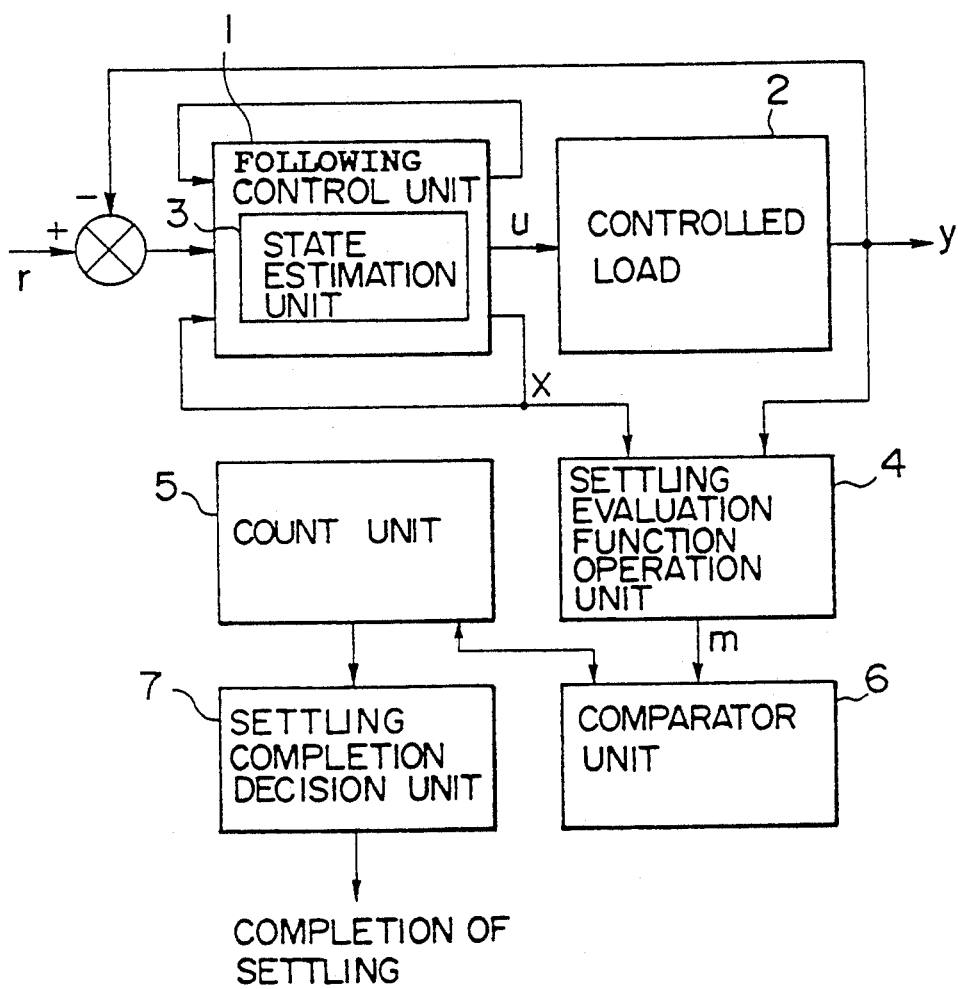
FIG. 5 is a block diagram showing an outline of the present invention.

FIG. 5 shows a settling monitor system for a following control apparatus. The settling monitor system shown in FIG. 5 supervises the settling of a transient response to a controlled load 2 driven by a following control unit 1. A state estimation unit 3, provided in the following control unit 1, estimates the state of the controlled load 2. A settling evaluation function operation unit 4 receives at least an output quantity y of the controlled load 2 and a state estimation quantity X (estimated quantity) calculated by the state estimation unit 3, and obtains an evaluated output m by inserting these quantities into a settling evaluation function. A count unit 5 measures a predetermined settling monitor time. A comparator unit 6 compares the evaluated output m with a counted value Ctr of the count unit 5, and replaces the settling monitor time of the count unit 5 with the evaluated output m. A settling completion decision unit 7 generates a settling completion signal when the count value of the count unit 5 has become equal to the predetermined settling monitor time measured by the count unit 5. It should be noted that the completion of settling is detected not only through the output quantity y of the controlled load 2, but also through the state estimation quantity X obtained by the state estimation unit 3.

The following control unit 1 is, for example, a servo controller that positions a head (which is the controlled load 2) on a rotary recording medium. In this case, the state estimation unit 3 generates estimated data showing a movement velocity v of the head. The settling evaluation function operation unit 4 calculates, on the basis of the head position y and the movement velocity v, a settling monitor time m necessary to supervise settling. The state estimation quantity X and the movement velocity v are estimated values and thus, hereinafter, "hat" symbols are attached thereto in equations and drawings, such as $\hat{X}$ and $\hat{v}$, for example.

An initial value No of the predetermined settling monitor time is preset in the count unit 5. The initial value No may be replaced by the calculation result m output by the settling evaluation function operation unit 4, as will be described in more detail later. The count unit 5 outputs the count value Ctr obtained by counting down from the preset initial value No, or the calculation result m preset by the comparator unit 6.

The comparator unit 6 compares the preset count value Ctr with the calculation result m output by the settling evaluation function operation unit 4. If the count value Ctr is larger than the estimated output m, that is:

Ctr > m then the count unit 5 is made to count down continuously without substituting the calculation result m for the count value of the count unit 5. Further, the comparator unit 6 compares the count value Ctr with the evaluation output m. If the count value Ctr is smaller than or equal to the calculation result m, that is:

Ctr ≦ m then the evaluated output m is preset in the count unit 5, and it is made to continuously execute down-counting. The settling completion decision unit 7 generates the settling completion signal when the count value Ctr becomes equal to zero.

According to the settling monitor system for the following control apparatus of the present invention, the state estimation unit 3 estimates not only the output quantity y of the controlled load 2 but also other states X. In the disk apparatus, not only the estimated head position y but also the estimated velocity v are contained in the vector X. Hence, it becomes possible to cope with a following control error which occurs after the completion of settling by using the head position y and the estimated velocity v in order to supervise the settling. That is, immediately before a following control error occurs, both the velocity component v and the position signal y increase. This case is estimated so that the controlled load 2 is moving toward the outside of the settling range. Hence, it becomes possible to determine that an updated settling monitor time (m) slightly longer than the initially set time (No) is needed.

Figure 6A:
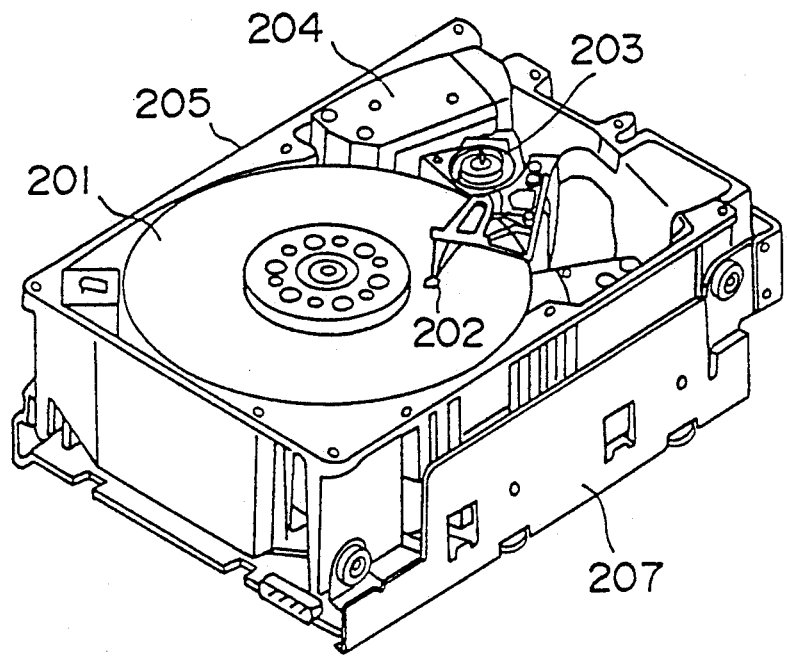
FIGS. 6A and 6B are diagrams of a magnetic disk apparatus to which the present invention is applied.
Figure 6B:
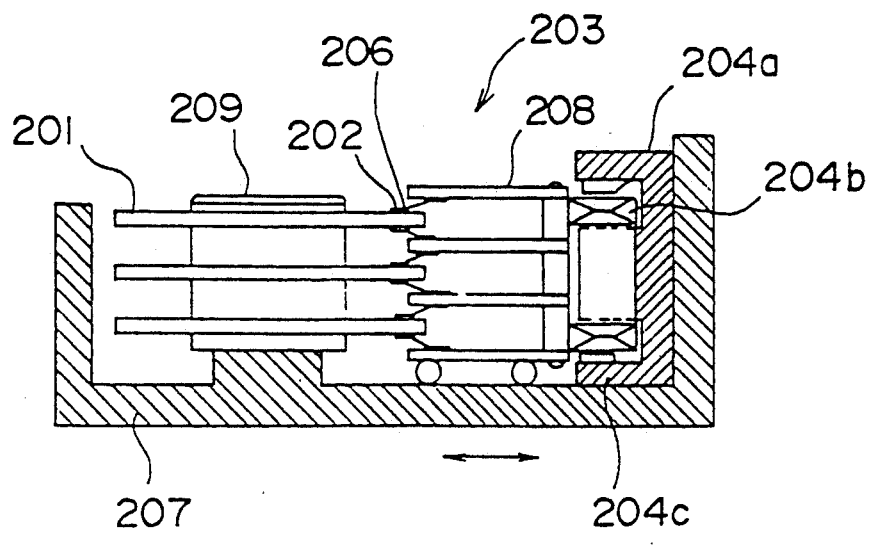

A description will now be given of a magnetic disk apparatus according to an embodiment of the present invention. FIG. 6A is a perspective view of the magnetic disk apparatus according to the embodiment of the present invention, and FIG. 6B is a cross sectional view of the apparatus shown in FIG. 6A. As shown, the magnetic disk apparatus is composed of disks 201, magnetic heads 202, an actuator 203, a voice coil motor (VCM) 204, a housing 205, load springs 206, a frame 207, head arms 208, and a spindle motor 209. The voice coil motor 204 includes magnets 204a, a coil 204b and yorks 204c.

Figure 7:
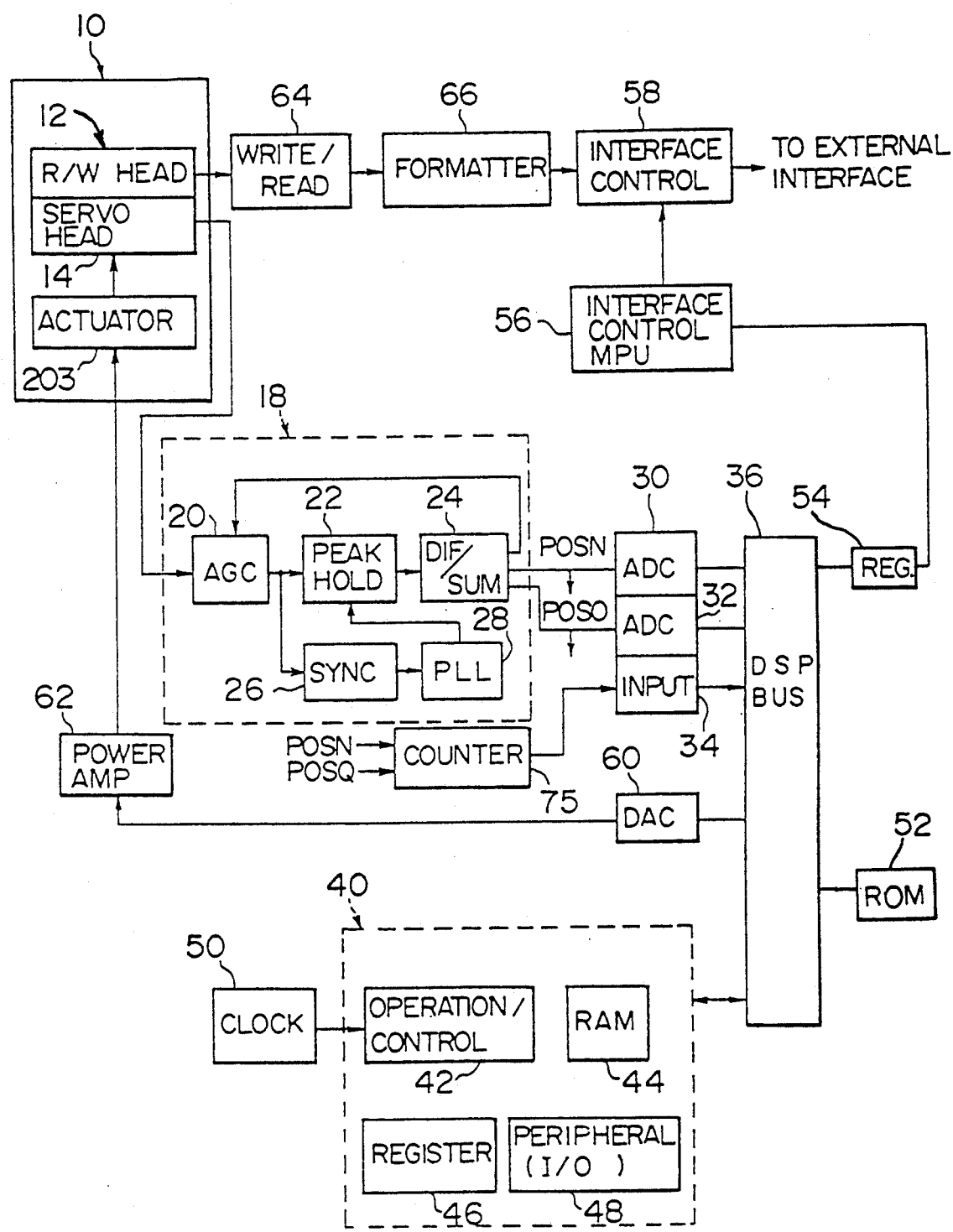
FIG. 7 is a block diagram of an embodiment of the present invention.

FIG. 7 is a block diagram of an electrical system of the magnetic disk apparatus shown in FIGS. 6A and 6B. A disk mechanism 10 accommodates the magnetic disks 201 (FIGS. 6A and 6B) which are rotated at a constant velocity by the spindle motor 209. The heads 202 include two different types, namely, read/write (R/W) heads 12, and servo heads 14. Similarly, the disks 201 include magnetic disks for use in information recording and a magnetic disk (servo disk) for use in servo control. Each of the read/write heads 12 and the servo heads 14 includes a built-in head IC. For the sake of simplicity, a pair of the read/write head 12 and the servo head 14 is illustrated in FIG. 7. The heads 12 and 14 are driven by the actuator 203 so that they move in the radial directions of the disks 201 and are positioned on desired tracks. A servo signal recorded on the servo disk is read by the servo head 14, and then applied to a servo demodulation circuit 18.

The servo demodulation circuit 18 is composed of an AGC (Automatic Gain Control) circuit 20, a peak hold circuit 22, a difference/sum creation circuit 24, a synchronous detection circuit 26, and a PLL (Phase Locked Loop) circuit 28. The AGC circuit 20 amplifies the servo signal, and the peak hold circuit 22 detects a peak value of the amplified servo signal, which is output to difference/sum creation circuit 24. This circuit 24 generates position signals POSN and POSQ.

Figures 8A, 8B, 8C:
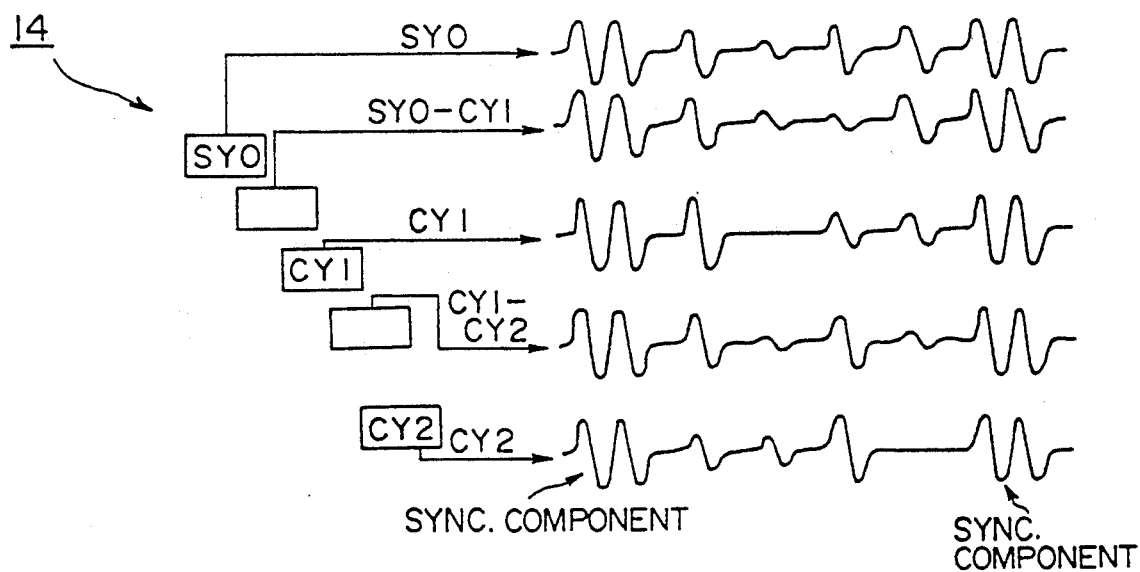
FIG. 8($a$–$c$) is a waveform diagram of a servo signal and position signals POSN and POSQ.

FIG. 8 shows waveforms of the servo signal obtained when the servo head 14 moves from a cylinder CY0 to a cylinder CY2. The waveforms of the servo signal shown in FIG. 8 are illustrated with respect to the respective cylinder positions. The servo signal is output to the peak hold circuit 22, which holds four peak parts existing between two consecutive large amplitudes and calculates the difference between the held peaks as well as the sum thereof. In this manner, the position signals POSN and POSQ are generated.

Figure 9:
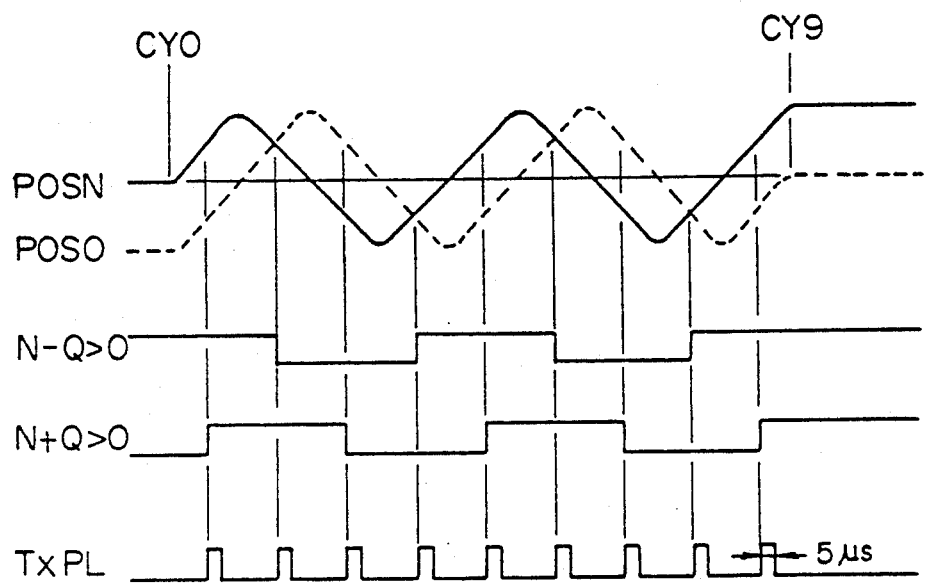
FIG. 9 is a waveform diagram of the position signals POSN and POSQ.

As shown in FIG. 9, a difference signal (N−Q) and a sum signal (N+Q) are generated from the position signals POSN and POSQ. A tracking cross pulse TXPL can be generated from the difference and sum signals. During the seek control process, a tracking cross counter 75 counts the number of tracking cross pulses TXPL, and obtains the number of tracks through which the head has passed up to the target track position. Even in the following control process of positioning the head on the target track after the completion of the seek operation, the position signal POSN is used and controlled so that the position signal POSN always indicates zero.

Returning to FIG. 7, the synchronous detection circuit 26 in the servo demodulation circuit 18 detects synchronous components of the servo signal shown in FIG. 8, and controls the PLL circuit 28 on the basis of the synchronous components. The peak hold circuit 22 creates timings for detecting the peaks of the servo signal except for the synchronous components. The servo demodulation circuit 18 is, for example, SS132H567 manufactured by Silicon System (SSI).

The signals POSN and POSQ generated by the servo demodulation circuit 18 are converted by AD converters (ADC) 30 and 32, respectively, and output to a DSP (Digital Signal Processing) bus 36. The number of tracks counted by the track counter 75 is output to the DSP bus 36 via an input circuit 34.

A servo control DSP 40 includes an operation/control circuit 42, an internal data RAM 44, an internal register 46, and a peripheral I/O device 48, such as a timer. The servo control DSP 40 receives servo demodulation information from the servo demodulation circuit 18 via the DSP bus 36, and executes a servo control by using a servo control program stored in a program storage ROM 52.

A clock generator 50 is connected to the servo control DSP 40. The servo control DSP 40 can communicate with an upper (high-order) computer via the DSP bus 36, a register 54 for use in communication, an interface MPU 56, and an interface control circuit 58. The servo control DSP 40 receives an access instruction from the upper computer, and executes the seek operation and the following control process after the completion of the seek operation.

In the following control process, the servo control DSP 40 makes a decision about the settling condition by using a state quantity obtained by a state-space method and a control quantity of the actuator 16. The servo control DSP 40 is formed with, for example, TMS320C25 manufactured by Texas Instruments.

The control quantity calculated by the servo control DSP 40 passes through the DSP bus 36, and is converted into an analog signal by a DA converter 60. This analog signal is amplified by a power amplifier 62, and an amplified analog signal drives the voice coil motor 204 of the actuator 203.

A write/read circuit 64 and a formatter circuit 66 are provided for the read/write head 12. During a write access, write data supplied from the upper computer is written into the related disk by the read/write head 12. During a read access, data is read out from the disk by the read/write head 12 and is transferred to the upper computer.

Figure 10:
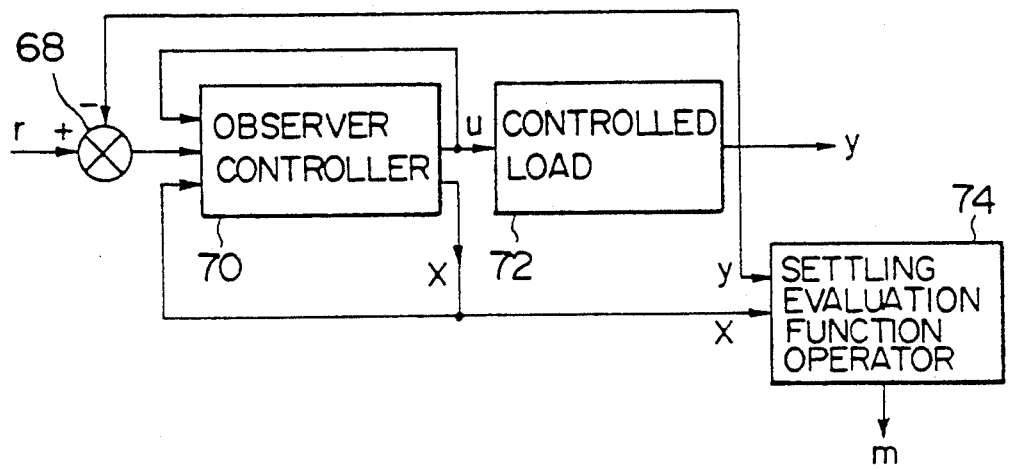
FIG. 10 is a block diagram of a basic structure for monitoring settling of a head.

FIG. 10 shows a basic structure of the settling monitor system of the present invention which is realized by the servo control DSP 40. As shown, the settling monitor system is composed of a sum point 68, an observer controller 70 having a state estimation function by a state-space method, a controlled load 72, and a settling evaluation function calculator 74. The controlled load 72 includes the actuator 203 and the heads 202.

In the following control by the observer controller 70, a reference value r and the output quantity y of the controlled load 72 are input to the observer controller 70, which outputs a driving quantity u to the controlled load 72 so that the reference value r and the output quantity y are equal to each other. The output quantity y can be generated by the track cross counter 75 which receives the signals POSN and POSQ. In addition to the above following control, the observer controller 70 has a state estimation function of simulating, on the basis of the output quantity y of the controlled load 72 (that is, the head position y) and the driving quantity u, the state of the controlled load 72 by the state-space method. By this state estimating function, the observer controller 70 generates a state estimation quantity X. The state estimation quantity X includes, for example, a velocity component of the head. The settling evaluation function calculator 74 operates an estimation evaluation function by using not only the head position y but also the state estimation quantity X, and obtains a time necessary to supervise the settling.

A description will now be given of the following control process of the head position through the state-space process executed by the observer controller 70 (the servo control DSP 40 shown in FIG. 7).

The disk mechanical part 10 shown in FIG. 7 is approximated as follows, by using double integral factors in the form of a primary approximation of the magnetic disk apparatus:

$$\dot{X} = F \cdot X + Gu$$

$$Y = H \cdot X$$

where u is the driving quantity, and X is a state vector described as follows:

$$x = \begin{bmatrix} x \\ v \end{bmatrix}.$$

where x is the position of the actuator (head) and v is the velocity thereof. Each matrix of the above basic equation, which depends on the characteristics of the voice coil motor 204, is as follows:

$$F = \begin{bmatrix} 0 & 1 \\ 0 & 0 \end{bmatrix} \quad G = \begin{bmatrix} 0 \\ b \end{bmatrix} \quad H = [1, 0]$$

where b is a constant of the disk mechanical part 16, and is normally described as follows:

b = B1/m = (equivalent actuator force constant)/ (equivalent head pointed end mass [Kg]).

In a discrete system, the above is expressed as follows:

$$\begin{bmatrix} x_{n+1} \\ v_{n+1} \end{bmatrix} = \begin{bmatrix} 1 & T \\ 0 & 1 \end{bmatrix} \begin{bmatrix} x_n \\ v_n \end{bmatrix} + \begin{bmatrix} T^2/2 \\ T \end{bmatrix} b \cdot u_n$$

$$y_{n+1} = [1 \; 0] \begin{bmatrix} x_{n+1} \\ v_{n+1} \end{bmatrix}$$

where T is a sampling period.

Assuming the following equations:

$$Tv_n = V_n$$

$$T^2 b/2 = g$$

the following equations are obtained:

$$\begin{bmatrix} x_{n+1} \\ V_{n+1} \end{bmatrix} = \Phi \begin{bmatrix} x_n \\ V_n \end{bmatrix} + \Gamma \cdot u_n$$

$$y_{n+1} = H \begin{bmatrix} x_{n+1} \\ V_{n+1} \end{bmatrix}$$

where:

$$\Phi = \begin{bmatrix} 1 & 1 \\ 0 & 1 \end{bmatrix} \quad \Gamma = \begin{bmatrix} g \\ 2g \end{bmatrix}.$$

Thus, an observer equation for carrying out the observer control is as follows:

$$\hat{X}_{n+1} = \Phi \cdot \hat{X}_n + \Gamma \cdot u_n + L(y_n - \hat{y}_n)$$

$$\hat{y}_{n+1} = H \cdot \hat{X}_{n+1}$$

where:

$$L = \begin{bmatrix} L1 \\ L2 \end{bmatrix}$$

and a controller equation is described as follows:

$$u_{n+1} = K \cdot \hat{X}_{n+1}$$

where K = [K1, K2].

By deleting $y_n$ and $\hat{y}_n$ from the above two equations, the following equations are obtained:

$$\hat{X}_{n+1} = (\Phi - L \cdot H)\hat{X}_n + \Gamma \cdot u_n + L \cdot x_n$$

$$u_{n+1} = K \cdot \hat{X}_{n+1}.$$

Hence, the next driving quantity $u_{n+1}$ can be determined from the following three equations:

$$\hat{x}_{n+1} = (1 - L1)\hat{x}_n + \hat{V}_n - g \cdot u_n + L1 \cdot x_n$$

$$\hat{V}_{n+1} = (-L2)\hat{x}_n + \hat{V}_n + 2g \cdot u_n + L2 \cdot x_n$$

$$u_{n+1} = K1 \cdot \hat{x}_{n+1} + K2 \cdot \hat{V}_{n+1}.$$

It will be noted that the optimal values of constants L1, L2, K1 and K2 can be obtained by solving a Riccati's equation by a known LQR method (see Gene F. Franklin et al., "Digital Control of Dynamic Systems [Second Edition], 1990, pp. 238-pp. 273 and pp. 417-pp. 431, 1990, the disclosure of which is hereby incorporated by reference).

A description will now be given of the settling evaluation function used in the present invention. A function posit (x) is defined as follows:

$$posit(x) = 1 \text{ for } x > 0$$

$$posit(x) = 0 \text{ for } x > 0.$$

Figure 11:
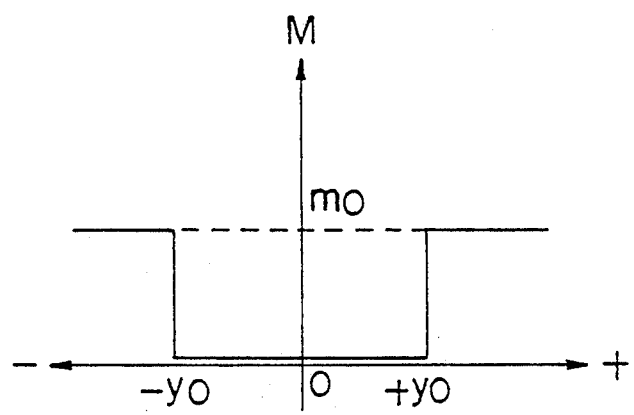
FIG. 11 is a waveform diagram showing a conventional settling evaluation function.

FIG. 11 shows a graph of the conventional settling evaluation function, which is described as follows:

$$M(y_n) = m_o \, posit(|y_n| - Y_o).$$

An example of the settling evaluation function used in the present invention is described as follows:

$$M(Y_n) = m_o[(Y_n - Y1) \, posit(|Y_n| - Y1) - (Y_n - Y_o) \, posit(|Y_n| - Y_o)]/(Y_o - Y1)$$

Figure 12:
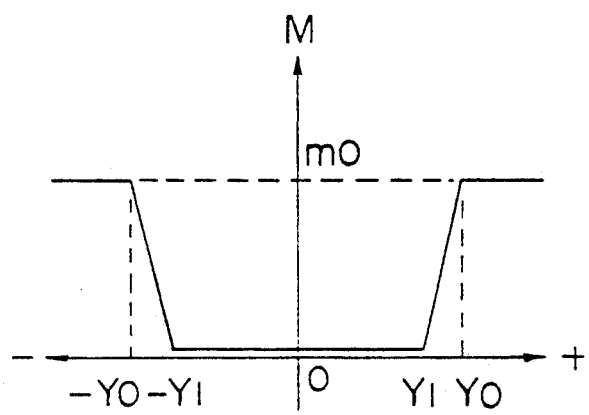
FIG. 12 is a waveform diagram showing a settling evaluation function used in the present invention.

This settling evaluation function does not define a step change as shown in FIG. 11, but instead defines a gradual change as shown in FIG. 12. The settling evaluation function shown in FIG. 12 is particularly effective to a condition that has a large amount of random noise.

Figure 13:
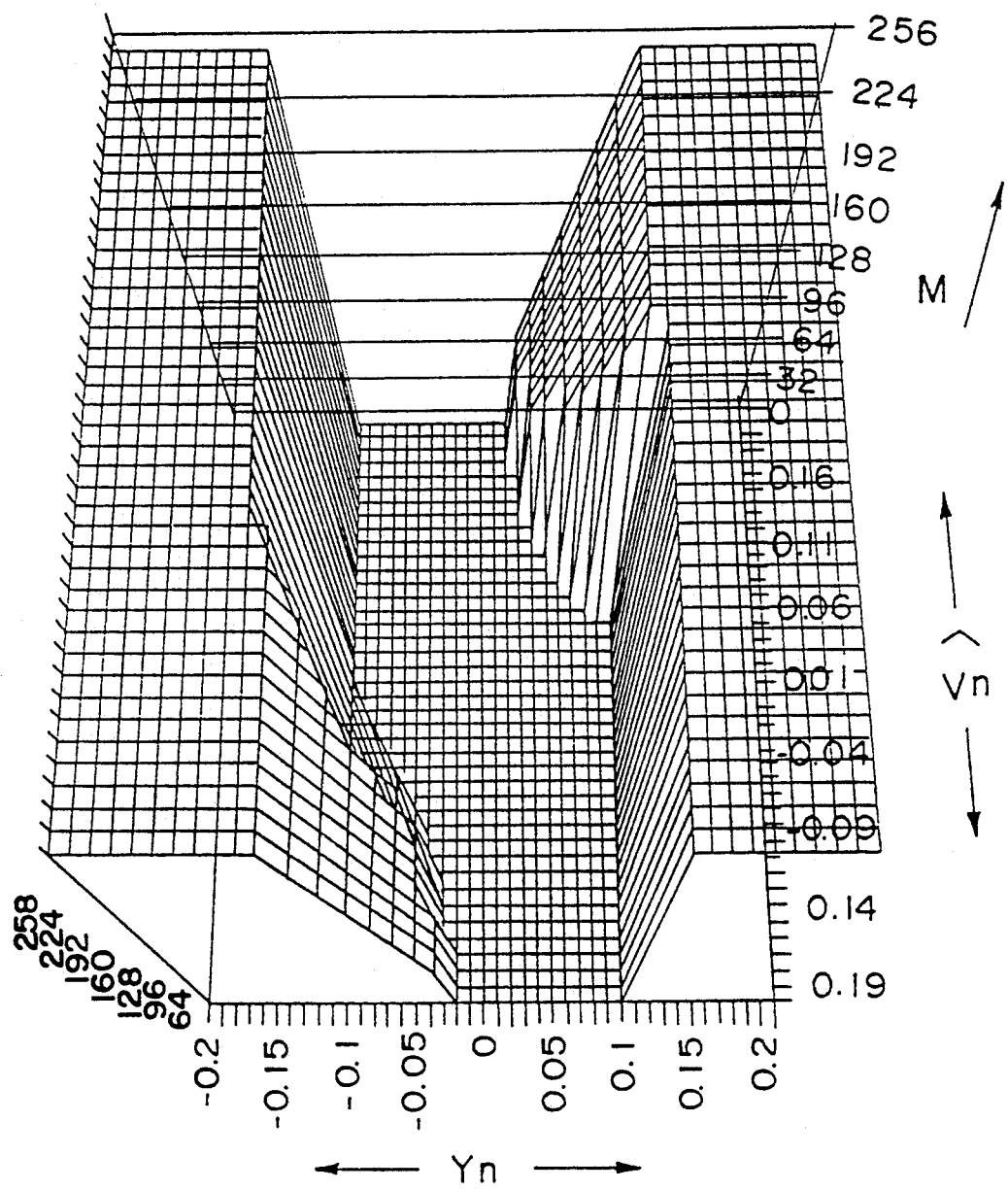
FIG. 13 is a diagram showing another settling evaluation function used in the present invention.

It is also possible to use the following settling evaluation function:

$$M(y_n, \hat{V}_n) = m_o \cdot posit(|Y_n| - Y_o)$$

$$+ m_1 \cdot |Y_n| posit(Y_n \cdot \hat{V}_n - m_v).$$

where $M(y_n, \hat{V}_n)$ is not larger than $m_o$. That is, if the calculation result of $M(y_n, \hat{V}_n)$ is larger than $m_o$, $M(y_n, V_n)$ is set equal to $m_o$. This settling evaluation function supervises the settling by referring to not only the position error $y_n$, but also to the estimated velocity $V_n$. The magnitude of the settling evaluation function M is as shown in FIG. 12, which is a contour diagram. The settling evaluation function shown in FIG. 13 is effective to a condition in which there are small noise components and large residual vibration components. Hence, this settling evaluation function will be most suitable for the settling supervision for the following control of the head positions.

It is also possible to use the following settling evaluation function:

$$M(y_n) = m_o(Y_n|_{t=0}, V_n|_{t=0}) \, posit(|Y_n| - Y_o).$$

This settling evaluation function determines the constant $m_o$ by using a positional error $Y_n|_{t=0}$ which occurs when the following control process starts and an estimated velocity $V_n|_{t=0}$ obtained at this time. Hence, the above settling evaluation function is effective for a condition in which there are a great change in the position error and a great change in the velocity when the control process switches from the seek control process to the following control process.

Figure 14A:
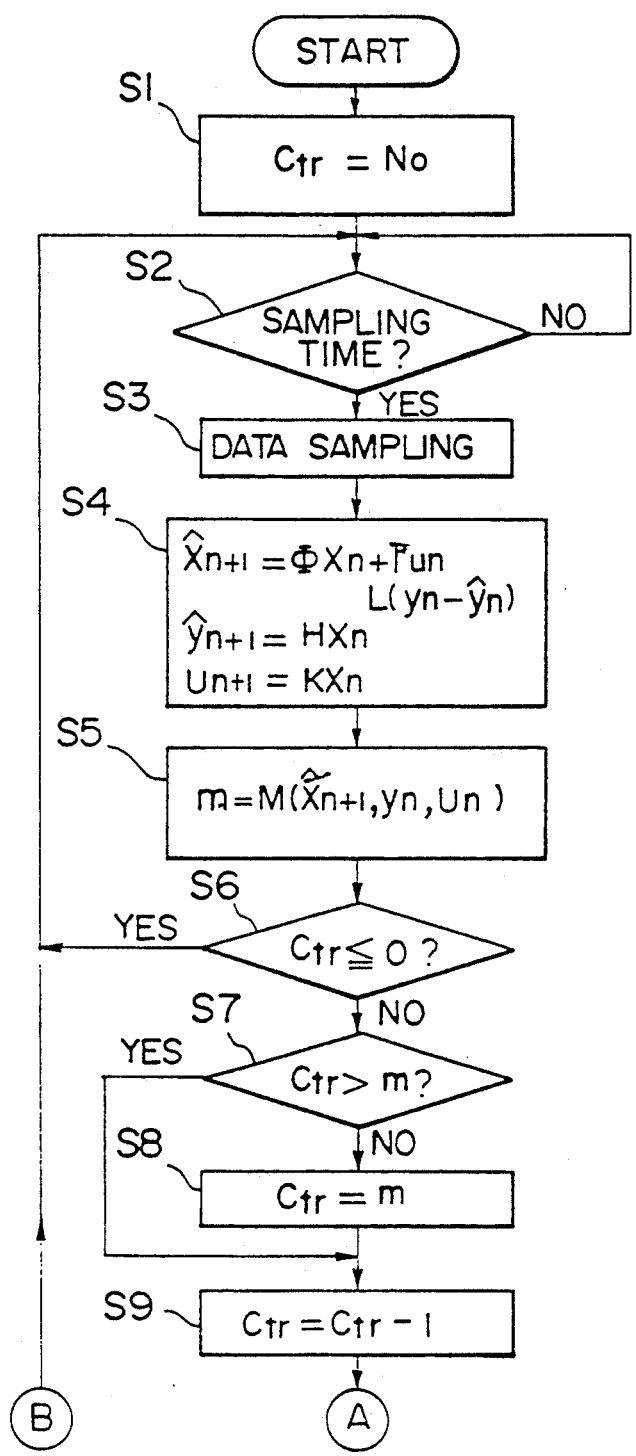
FIGS. 14A and 14B are flowcharts of a settling monitor process of the present invention.
Figure 14B:
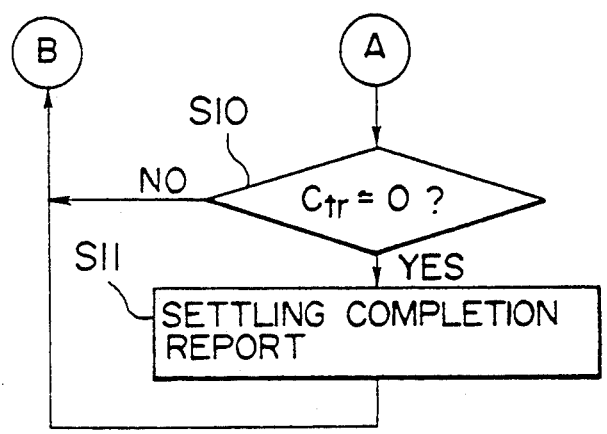

FIGS. 14A and 14B are flowcharts of the settling monitor process executed by the servo control DSP 40 shown in FIG. 7. The process shown in FIG. 14A starts when the seek operation of the head 12 has been completed and the control process switches to the following control process for following up positioning of the head 12 on a target track.

Figure 1:
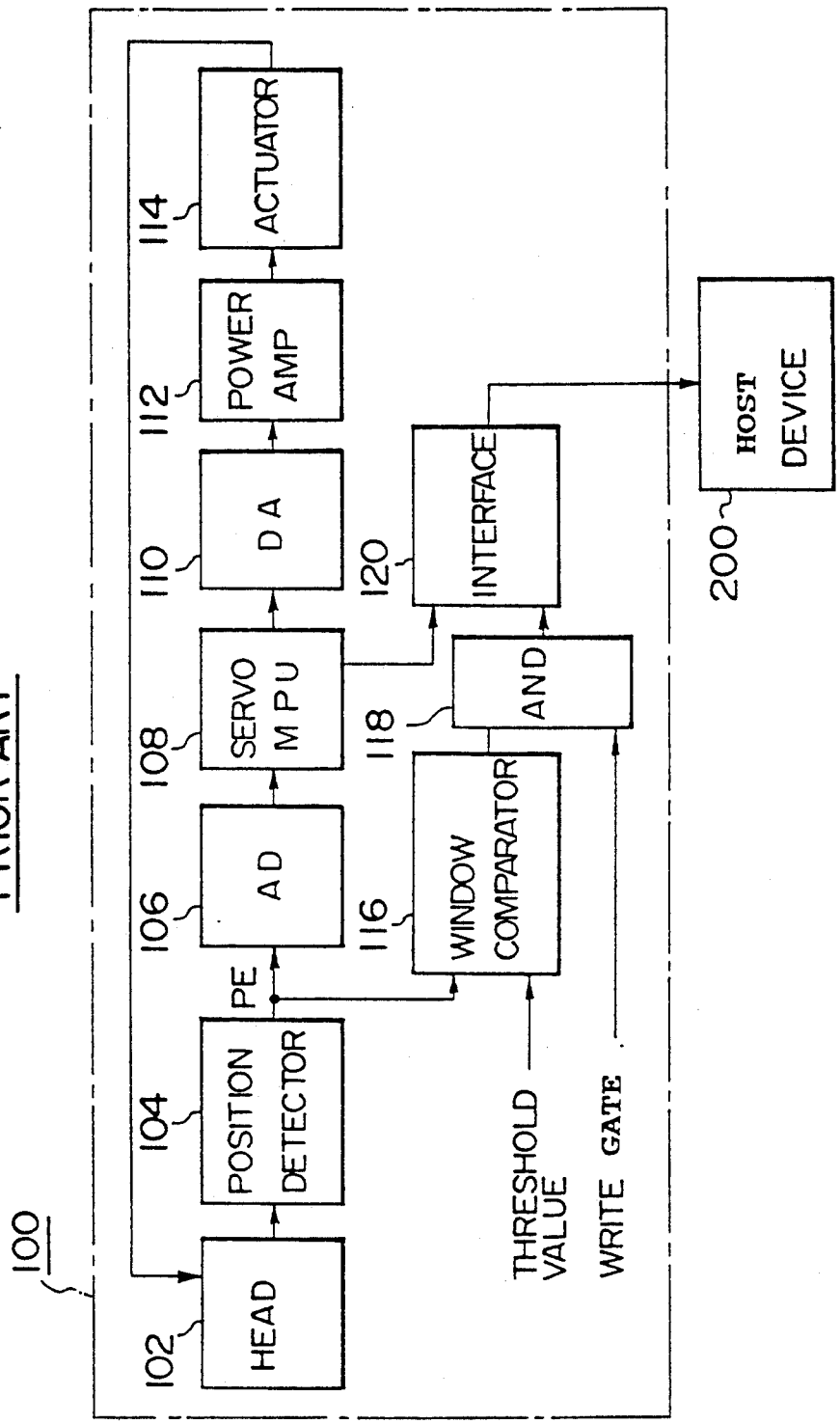
FIG. 1 is a block diagram of a magnetic disk apparatus equipped with a conventional settling monitor system.
Figure 2:
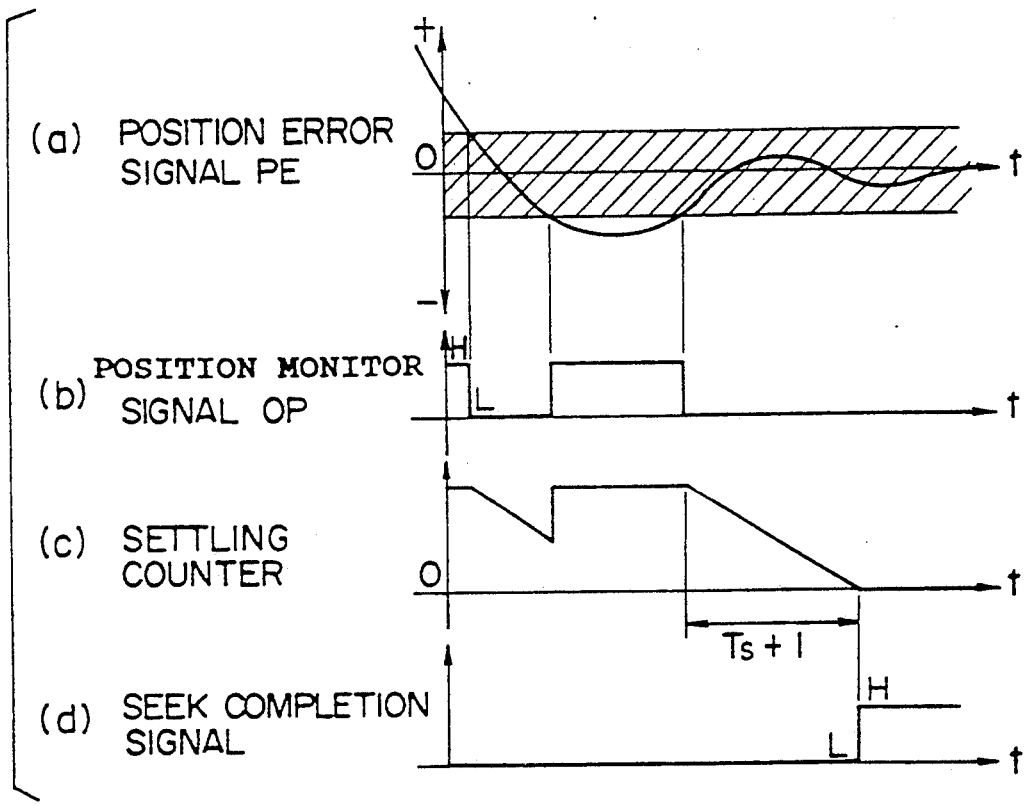
FIG. 2 is a waveform diagram showing a process for determining whether or not the seek operation has been completed.
Figure 3:
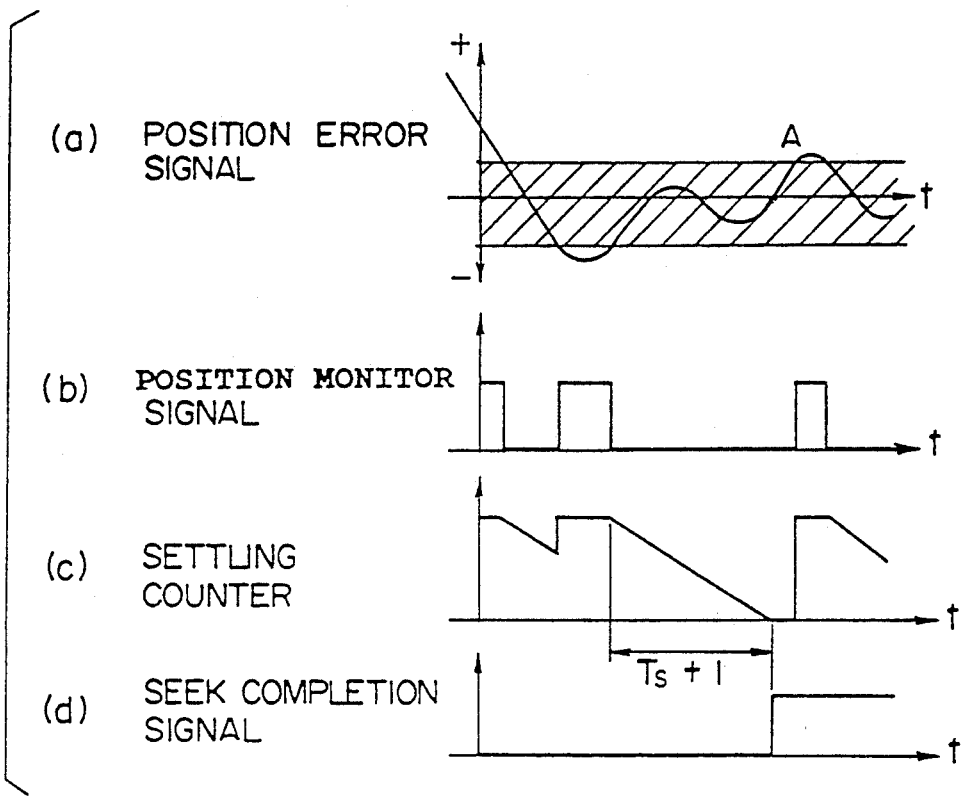
FIG. 3 is a waveform diagram showing a disadvantage of the conventional settling monitor system.
Figure 4:
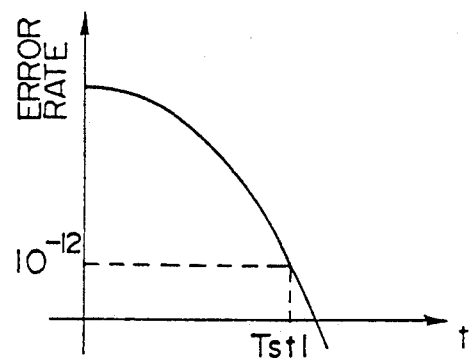
FIG. 4 is a graph showing the relationship between the error rate and the settling monitor time.

At step S1 shown in FIG. 14A, the settling counter Ctr is initialized so that Ctr=No. The initial value No of the settling counter Ctr is equal to the settling monitor time Tst1, which corresponds to an error rate of $10^{-12}$, for example as shown in FIG. 4. At subsequent step S2, it is determined whether or not the present time is a sampling time. When the result obtained at step S2 is YES, the head driving quantity $u_n$ and the output quantity $x_n$ obtained at the present sampling time are generated at step S3. At step S4, the calculation based on the aforementioned state-space method is executed, so that the next driving quantity $u_{n+1}$ is obtained. At the same time as the above, the position error $y_{n+1}$ and the estimated velocity $V_{n+1}$ are obtained.

At step S5, the time n necessary for monitoring the settling is calculated by the setting evaluation function N, as shown in FIG. 12 or FIG. 13, into which the position error $y_{n+1}$ and the estimated velocity $V_{n+1}$ are inserted. At step S6, it is determined whether or not the count value of the setting counter Ctr is equal to or smaller than zero. When the counter value Ctr is equal to zero, it is determined that the head 12 is already in the settled state. In this case, the settling is not monitored, and steps S2-S5 are repeatedly carried out.

When it is determined, at step S6, that the counter value Ctr is larger than zero, it is determined that the settling is being monitored. At step S7, it is determined whether or not the counter value of the settling counter Ctr is larger than the time m (obtained at step S5) necessary for monitoring the settling. When the result obtained at step S7 is YES, it is determined that there is no possibility that a following error will occur after the completion of supervision of the settling. In this case, step S8 is skipped, and the counter value of the settling counter Ctr is decremented at step S9. When the counter value of the settling counter Ctr is smaller than the time m obtained at step S5, it is determined, taking into account the estimation of the state-space method, that a following error may occur if the current counter value of the settling counter Ctr is continuously used for monitoring the settling. Hence, at step S8, the counter value of the settling counter Ctr is preset to the time m necessary for monitoring the settling. After this, step S9 is executed.

At step S10 shown in FIG. 10, it is determined whether or not the counter value of the settling counter Ctr is larger than or equal to zero. When the result of this determination is YES, step S2 is executed. When it is determined, at step S10, that the counter value of the settling counter Ctr is equal to zero, the servo control DSP 40 informs the upper computer of the completion of settling at step S11. After this, the write operation can be started.

As has been described previously, the counter value of the settling counter Ctr is decremented without replacing the present settling counter value with the time m necessary for monitoring the settling if it is determined, at step S7, that the present setting counter value Ctr is larger than the time m obtained at step S5. Alternatively, it is possible to preset the settling counter Ctr to the time m and execute down counting each time m is obtained.

In the embodiment as described above, the velocity component is used as the estimated state quantity. However, it is possible to use any of other estimated state quantities, such as acceleration components.

The present invention is not limited to the magnetic disk apparatus as has been described above, but may be applied to other apparatuses, such as an optical disk apparatus and a magneto-optic disk apparatus. Further, the present invention is not limited to these disk devices, but may be applied to the settling monitor for other following control apparatuses.

What is claimed is:

1. A system for monitoring settling of a transient response of a load controlled by a following controller, said system comprising:
    state estimation means for generating a state estimation quantity showing an estimated state of the load;
    means, coupled to said load and said state estimation means, for calculating settling monitoring time data based on the state estimation quantity and a control quantity output to the load by the following controller;
    timer means for generating time data showing a time elapsed since commencement of supervision of settling;
    comparator means, coupled to said calculated settling monitoring time data generating means and said timer means, for comparing said calculated settling monitoring time data and said time data with each other and for replacing the time data of said timer means with the calculated settling monitoring time data on the basis of a comparison result; and
    decision making means, coupled to said timer means, for generating a settling completion signal when the time data shows a predetermined time.

2. A system as claimed in claim 1, wherein:
    said following controller comprises a servo controller which positions the load;
    the state estimation quantity includes first data showing a velocity estimate of the load;
    the control quantity includes second data showing a position of the load;
    said settling evaluation function operation means comprises means for generating, from said first and second data, a time necessary for monitoring settling of the load, said time corresponding to said evaluated output.

3. A system as claimed in claim 1, wherein:
    said timer means comprises a counter in which an initial value is preset; and
    said comparator means comprises means for replacing a counter value of said counter with calculated settling monitoring time data.

4. A system as claimed in claim 3, wherein said counter is a down counter which executes a down-count operation from said initial value.

5. A system as claimed in claim 1, wherein:
    said timer means comprises a counter; and
    said comparator means comprises means for making said counter continuously execute a count operation without replacing a counter value of said counter with the calculated settling monitoring time data when the counter value is larger than the calculated settling monitoring time data.

6. A system as claimed in claim 1, wherein:
    said timer means comprises a counter; and
    said comparator means comprises means for replacing a counter value of said counter with the calculated settling monitoring time data and for making said counter continuously execute a count operation, when the counter value is smaller than or equal to the calculated settling monitoring time data.

7. A system as claimed in claim 1, wherein:
    said timer means comprises a counter; and
    said decision making means comprises means for generating said settling completion signal when a counter value of said counter becomes equal to a predetermined counter value corresponding to said predetermined time.

8. A system as claimed in claim 1, wherein said load comprises a servo controller which positions a head for writing and/or reading data into and/or from a disk-shaped recording medium.

9. A system for monitoring settling of a transient response of at least one head controlled by a following controller, said system comprising:
    state estimation means for generating a velocity estimate of the head;
    means, coupled to said head and said state estimation means, for generating calculated settling monitoring time data by inputting, to a predetermined settling evaluation function, calculated settling monitoring time data based on the velocity estimate and data showing a position of the head determined by the following controller, said calculated settling monitoring time data showing a time necessary for monitoring the settling of the transient response determined by a predetermined settling evaluation function;
    timer means for generating time data showing a time elapsed since commencement of supervision of settling;
    comparator means, coupled to said generating means and said timer means, for comparing said calculated settling monitoring time data and said time data with each other and for replacing the time data of said timer means with the calculated settling monitoring time data on the basis of a comparison result; and
    decision making means, coupled to said timer means, for generating a settling completion signal when the time data shows a predetermined time.

10. A system as claimed in claim 9, wherein:
    said timer means comprises a counter in which an initial value is preset; and
    said comparator means comprises means for replacing a counter value of said counter with the calculated settling monitoring time data.

11. A system as claimed in claim 10, wherein said counter is a down counter which executes a down-count operation from said initial value.

12. A system as claimed in claim 9, wherein:
    said timer means comprises a counter; and
    said comparator means comprises means for making said counter continuously execute a count operation without replacing a counter value of said counter with the calculated settling monitoring time data when the counter value is larger than the calculated settling monitoring time data.

13. A system as claimed in claim 9, wherein:
    said timer means comprises a counter; and said comparator means comprises means for replacing a counter value of said counter with the calculated settling monitoring time data and for making said counter continuously execute a count operation, when the counter value is smaller than or equal to the calculated settling monitoring time data.

14. A system as claimed in claim 9, wherein:

said timer means comprises a counter; and said decision making means comprises means for generating said settling completion signal when a counter value of said counter becomes equal to a predetermined counter value corresponding to said predetermined time.

15. A disk apparatus comprising:

head means for writing and reading data into and from a disk-shaped recording medium;

read/write means, coupled to said head means, for outputting the data read by said head means to an external device and for outputting the data supplied from the external device to said head means;

actuator means for moving said head means to access a desired track position; and servo controls means, coupled to said head means and said actuator means for positioning said head and detecting settling a transient response of said head means, said servo control means comprising:

state estimation means for generating a velocity estimate of the head means;

means, coupled to said head means and said state estimation means, for calculating settling monitoring time data based on the velocity estimate and data showing a position of the head means determined by the following controller;

timer means for generating time data showing a time elapsed since commencement of supervision of settling;

comparator means, coupled to said calculated settling monitoring time data generating means and said timer means, for comparing said calculated settling monitoring time data and said time data with each other and for replacing the time data of said timer means with calculated settling monitoring time data output on the basis of a comparison result; and decision making means, coupled to said timer means, for generating, for generating a settling completion signal when the time data shows a predetermined time.

16. A disk apparatus as claimed in claim 15, wherein:

said timer means comprises a counter in which an initial value is preset; and said comparator means comprises means for replacing a counter value of said counter with the calculated settling monitoring time data.

17. A disk apparatus as claimed in claim 16, wherein said counter is a down counter which executes a down-count operation from said initial value.

18. A disk apparatus as claimed in claim 15, wherein:

said timer means comprises a counter; and said comparator means comprises means for making said counter continuously execute a count operation without replacing a counter value of said counter with the calculated settling monitoring time data when the counter value is larger than the calculated settling monitoring time data.

19. A disk apparatus as claimed in claim 15, wherein:

said timer means comprises a counter; and said comparator means comprises means for replacing a counter value of said counter with the calculated settling monitoring time data and for making said counter continuously execute a count operation, when the counter value is smaller than or equal to the calculated settling monitoring time data.

20. A disk apparatus as claimed in claim 15, wherein:

said timer means comprises a counter; and said decision making means comprises means for generating said settling completion signal when a counter value of said counter becomes equal to a predetermined counter value corresponding to said predetermined time.

* * * * *

UNITED STATES PATENT AND TRADEMARK OFFICE
CERTIFICATE OF CORRECTION

PATENT NO. : 5,307,330
DATED : April 26, 1994
INVENTOR(S) : Eiji Okamura

It is certified that error appears in the above-indentified patent and that said Letters Patent is hereby corrected as shown below:

Column 4, line 49, delete "No" and insert --$N_0$--.

Column 9, line 17, delete "$x>0$" and insert --$x \leq 0$--.

Column 9, line 44, delete "Vn" and insert --$\overline{Vn}$--.

Column 9, line 47, delete "Vn" and insert --$\hat{Vn}$--.

Signed and Sealed this

Ninth Day of May, 1995

Attest:

BRUCE LEHMAN

*Attesting Officer*    *Commissioner of Patents and Trademarks*